United States Patent [19]

Charpin et al.

[11] Patent Number: 4,888,033

[45] Date of Patent: Dec. 19, 1989

[54] METHOD OF MANUFACTURING PERMEABLE MINERAL MEMBRANES

[75] Inventors: Jean Charpin, Paris; André Grangeon, Valreas; Francis Pejot, Piolenc; Pierre Plurien, Palaiseau; Bernard Rasneur, Le Mesnil St-Denis; Serge Richard, Pont St-Esprit; René Veyre, Montelimar, all of France

[73] Assignee: Commissariat A L'Energie Atomique, Paris, France

[21] Appl. No.: 114,974

[22] Filed: Feb. 8, 1980

Related U.S. Application Data

[63] Continuation of Ser. No. 891,442, Mar. 20, 1978, abandoned.

[30] Foreign Application Priority Data

Apr. 12, 1977 [FR] France ................. 77 10924

[51] Int. Cl.$^4$ .............. B01D 13/04; B01D 59/14; B22F 3/22; B22F 3/16; B22F 3/10

[52] U.S. Cl. ........................... 55/158; 55/16; 252/315.7; 264/0.5; 264/42; 264/43; 264/45.1; 264/48; 264/60; 264/66; 423/625; 423/626; 423/629; 501/80; 501/85; 501/127; 501/153; 428/566; 428/307.7; 428/312.2; 428/312.8; 428/316.6; 428/318.8; 428/319.1

[58] Field of Search .............. 55/16, 158; 264/86, 264/0.5, 42, 43, 45.1, 48, 60, 61; 428/566, 307.7, 312.2, 312.8, 316.6, 318.8, 319.1; 106/73.4, 40 R, 41; 423/625, 626, 629; 252/317, 315.7; 501/80, 85, 127, 153

[56] References Cited

U.S. PATENT DOCUMENTS

| 3,397,968 | 8/1968 | Lavendel et al. | 428/566 |
|---|---|---|---|
| 3,453,104 | 7/1969 | De March et al. | 428/566 |
| 3,637,406 | 1/1972 | Bailey | 106/73.4 |
| 3,725,094 | 4/1973 | Levy, Jr. et al. | 106/73.4 |
| 3,846,146 | 11/1974 | Hunting et al. | 106/73.4 |
| 3,862,846 | 1/1975 | Smoak et al. | 106/73.4 |
| 3,957,559 | 5/1976 | Hoffman, Jr. | 55/158 |
| 4,039,703 | 8/1977 | Kamijo et al. | 55/158 |
| 4,053,662 | 10/1977 | Bergez et al. | 55/158 |
| 4,069,057 | 1/1978 | Kamei et al. | 106/73.4 |

FOREIGN PATENT DOCUMENTS

| 2504463 | 8/1976 | Fed. Rep. of Germany | 106/73.4 |
|---|---|---|---|
| 49-65392 | 6/1974 | Japan | 106/73.4 |
| 7211238 | 2/1973 | Netherlands | 55/158 |
| 883760 | 12/1961 | United Kingdom | 55/158 |
| 1358501 | 7/1974 | United Kingdom | 55/158 |

*Primary Examiner*—Teddy S. Gron
*Attorney, Agent, or Firm*—Kerkham, Stowell, Kondracki & Clarke

[57] ABSTRACT

The invention relates to a method of manufacturing permeable mineral membranes.

The method of the invention is characterized in that a thin layer of gel of peptised hydroxide of at least aluminum is deposited on a permeable porous substrate and the resulting membrane is dried and fired at a temperature between 500° and 1100° C.

The resulting membranes can be used for isotopic separation of gases or for filtration and ultrafiltration.

20 Claims, No Drawings

METHOD OF MANUFACTURING PERMEABLE MINERAL MEMBRANES

This is a continuation of application Ser. No. 891,442, filed Mar. 20, 1978, now abandoned.

The invention relates to a method of manufacturing porous, permeable mineral membranes on a porous substrate.

In one of the conventional methods of manufacturing this kind of membrane, one or more active layers of a simple or mixed oxide arae deposited on a porous, permeable substrate from a suspension of particles or agglomerates of powder in a liqluid, after which the resulting structure is dried, compressed and sintered. In the prior-art methods, the compression operation is necessary for reorganizing the layer or layers deposited onto the substrate, to obtain high mechanical strength by increasing the cohesion in the layer or layers and, if required, their adhesion to the substrate.

The method according to the invention can be used to obtain porous, permeable minera membranes supported by a porous substrate, and is simpler than the previously-described method inter alia in that a compression operation is not necessary.

The method of manufacturing a porous, permeable mineral membrane according to the invention is characterised inter alia in that a thin layer of a gel of peptised hydroxide of at least aluminum is deposited on a permeable porous substrate and the resulting membrane is dried and fired at a temperature between 500° and 1100° C.

The gel used according to the invention can either be of peptised aluminum hydroxide or of a peptised mixed hydroxide of aluminium capable of forming an aluminum spinel after pyrolysis, e.g. a gel of peptised mixed aluminium and magnesium hydroxide.

In the method according to the invention, the peptised aluminum hydroxide gel is deposited onto a permeable porous substrate by the slip-painting method.

It is known that, in the method of slip painting used for depositing a suspension of solid particles in a liquid, the internal and/or external wall of the porous substrate is brought into contact with the suspension for forming the layer which it is desired to deposit on to the porous substrate. More specifically, contacting is brought about by bringing the substrate into communication with a tank containing the suspension of solid particles; the tank has a deformable membrane which, under pressure from a liquid, can produce variaations in the volume inside the tank, thus raising or lowering the suspension of solid particles along the porous substrate.

After the resulting structure has been dried and heat-treated at 500° to 1100° C., a permeable mineral membrane is obtained, comprising a thin active layer deposited on a porous substrate, the thin layer being microporous and homogeneous and having a thickness of a few microns and a porous texture a few tens of Angstrom units thick. The texture is adapted depending on the proposed uses of the membrane.

The porous, permeable substrates used by the method according to the invention should have a surface adapted to receive the layer of gel and having a porous texture having a pore radius below $2\mu$, any irregularities in the surface state being less than a few microns so as (a) to prevent substantial penetration of gel into the pores of the substrate and (b) prevent cracks or macropore defects. The substrates must have good mechanical strength, high permeability and a satisfactory surface state; accordingly they must be made up of a rough support having large pore radii (e.g. from 4 to $20\mu$), covered by a thin layer a few tens of microns thick and having a much finer texture (from 0.05 to $2\mu$) which can be made (e.g. nickel) or of ceramic material (e.g. alumina).

The viscosity of the gel is adjusted to obtain suitable wettability on the substrate. The viscosity can be adjusted either by varying the gel concentrataion (by diluting it or during preparation thereof) or by adding a thickener.

The aluminium hydroxide gel can be prepared e.g. as follows. The starting substance is an aluminum alcoholate, e.g. aluminium tertiobutylate or isopropylate. The aluminium alcoholate is hydrolyzed in a large excess of water (number of mols of $H_2O$/No. of moles of Al approximately 100) at a temperature of approximately 80° C. Next, the resulting hydrated aluminium oxide is peptised, likewise at a temperature of approximately 80° C., in the presence of a strong acid such as hydrochloric or perchloric acid, for a few fours to three days. The resulting substance is a transparent peptised gel, also called a sol (or colloidal suspension). Aluminium hydroxide sols of the aforementioned kind are available commercially (boehmite sol). The concentration of the peptised gel obtained by evaporation can be adjusted depending on the quantity which it is desired to deposit on the porous substrate. The maximum concentration of gel is obtained when the ratio of strong acid to alcoholate is approximately 0.07.

The peptised gel of aluminium hydroxide is deposited, e.g. by slip painting, on a porous substrate having the characteristics given previously. The resulting structure is dried at moderate temperature, then heat-treated at 500° to 1100° C. The heat treatment serves a double purpose: (a) conventing $Al(OH)_3$ hydroxide into crystalline $Al_2O_3$ oxide, which requires a minimum temperature of approximately 500° C. and (b) subsequently adjusting the pore size, depending on the proposed application, by sintering, by varying the temperature between 500° and 1100° C. Thus, if the temperature is 500° C. for an hour, the result is a microporous alumina layer having a $\gamma$ structure and an average pore radius of approximately 20 Å, whereas if the tempeature is 850° C. for an hour, the microporous $\gamma$ alumina structure has an average pore radius of approximately 40 Å. The porosity is approximately 62 to 65%.

The permeability to nitrogen of the resulting membrane can vary from 200 to $3000 \times 10^{-7}$ mols/cm Hg/cm²/min when the thickness of the microporous layer varies from 15 to $2\mu$.

A mixed hydroxide gel can be prepared by hydrolyzing an aluminium salt, then adding a salt of the chosen metal. The metal, which is capable of forming a spinel structure with aluminium, can be e.g. magnesium, cobalt, copper, iron, manganese or nickel. In the case of magnesium, the added substance can be e.g. a magnesium acetate, isopropylate or pechlorate, dissolved in water. The quantity of magnesium is chosen so as to obtain a spinel having the formula n $Al_2O_3$, MgO, wherein n is greater than or equal to unity, after firing above 800° C. Next, the substance is peptised for a few hours to 3 days in the presence of a strong acid such as perchloric acid. After the resulting colloidal suspension has been concentrated by evaporatioon, a mixed hydroxide sol is obtained and can be sent through a filter having approximately 0.4 $\mu$ pores, to obtain perfect homogeneity. Alternatively the aluminium hydroxide can be peptised before adding the salt of the other metal.

After the viscosity of the gel has been adjusted, it is deposited, e.g. by slip-painting, on the previous-defined permeable porous substrate. Next, the structure is dried at a moderate temperature, then fired at a temperature above 800° C., up to 1100° C. As before, the heat treatment has a double purpose—i.e. of converting the mixed hydroxide into a mixed spinel oxide, which requires a minimum temperature of 800° C., and subsequently adjusting the pore size, depending on the proposed application, by sintering at a temperature varied from 800° to 1100° C.

Thus, when the firing temperature is 850° C. for an hour, the resulting microporous layer has a uniform spinel structure and an average pore radius of approximately 40 Å, whereas when the firing temperature is 1000° C. for an hour, the average pore radius is approximately 50 Å.

In an advantageous embodiment of the method according to the invention, a second layer of peptised gel can be deposited after the membrane has been finished, thus making good any faults resulting from insufficient wetting during the first deposition, and filling any cracks formed when the first deposit is fired.

The invention will be more clearly understood from the following description of some embodiments of the method. Of course, these examples in no way limit the invention.

EXAMPLE 1

A permeable mineral membrane was manufactured by depositing a monolayer of a gel of pepised aluminium and magnesium mixed hydroxide corresponding to an Al/Mg ratio of 6, on to a porous, permeable substrate. The manufacturing process was as follows:

The starting substance was a boehmite sol in suspension in water containing 30 g oxide per liter.

The solution was diluted to 150° in permutite-softened, distilled water. An aqueous solution of magnesium acetate was added to the first-mentioned solution in the proportions of 40 parts boehmite sol per 10 parts of 81 g/l magnesium acetate solution.

Two porous substrates a, b in the form of α alumina tubes were used. Their inner surfaces had a coating having an average pore radius of 0.4μ or 0.6μ (the coating was deposited on a support having a pore radius of 6μ). The corresponding bulloscopic clearing pressures for an air perfusion rate of $120 \times 10^{-3}$ mol/min were 600 mb and 490 mb respectively, corresponding to a just measurable quantity of faults above 0.8μ and 0.96μ respectively.

The gel was deposited by slip-painting the inner surface of the substrate. Next, the structure was dried for 15 hours at ambient temperature and in an atmosphere having 60% humidity. It was then fired at 850° C. for an hour. The resulting membrane comprised at layer of 3 $Al_2O_3$, MgO spinel structure having the characteristics given in Table 1 hereinafter:

TABLE 1

| | Characteristics of support | | Characteristics of membrane | |
|---|---|---|---|---|
| Support | average pore radius of internal surface of support | bulloscopic clearing pressure, alcohol at $120 \times 10^{-3}$ mol/min. | Permeability to nitrogen ($10^{-7}$ mol/cm Hg/cm$^2$/min) | Pore radius in gas permeametry |
| a | 0.4μ | 600 mb | 3 800 | 70 Å |
| b | 0.6μ | 490 mb | — | >100 Å |

EXAMPLE II

A permeable mineral membrane was manufactured by depositing a monolayer of a gel of peptised mixed aluminium and magnesium hydroxide on to a porous, permeable substrate.

The boehmite sol used was identical with that taken as the starting substance in Example I. It was passed through a filter having a pore size of 0.4μ. The sol was diluted in 100% water and 50% alcohol. Next, an aqueous solution of magnesium acetate was added in the proportion of 40 parts boehmite sol per 10 parts of 81 g/l magnesium acetate solution.

The porous substrate used was of type a in Example I.

The resulting peptised mixed gel was deposited by slip-painting the inner surface of the support a ambient temperature.

Next, the substrate was dried for 15 hours at ambient temperature in an atmosphere with 60% humidity, after which the structure was fired at 850° C. for an hour.

Table II hereinafter gives the characteristics of the resulting homogenous 3 $Al_2O_3$, MgO spinel structure.

TABLE II

| Thickness of layer | Permeability to nitrogen ($10^{-7}$ mol/cm Hg/cm$^2$/min) | Pore radius of layer measured by gas permeametry between 7 bars and 14 bars | Average pore radius of layer | Porosity of layer |
|---|---|---|---|---|
| 4μ | 800 to 1100 | 27Å | 37Å | 63% |

The resulting membrane, when used for enriching a natural mixture of argon 36 and argon 40 by gaseous diffusion, had a separation efficiency of 0.749 to 0.722.

EXAMPLE III

A permeable mineral membrane of 3 $Al_2O_3$,MgO spinel was manufactured by depositing a double molecular layer of peptised gel on to a porous substrate. The membrane constructed in Example II was taken and a second layer of the same peptised gel was deposited in the same manner as in Example II. Next, the layer was dried and fixed as in Example II.

TABLE III hereinafter gives the characteristics of the resulting membrane.

TABLE III

| Permeability to nitrogen ($10^{-7}$ mol/cm Hg/cm$^2$/min) | Pore radius measured by gas permeametry between 7 bars and 14 bars. | Efficiency in separating a natural argon mixture |
|---|---|---|
| 750 | 20 Å | 0.755 |

It can be seen from comparing the data in Table III with Table II that a membrane having two layers has lower permeametry and is more efficient in separating a mixture of argon.

EXAMPLE IV

A permeable mineral membrane was made from 3 $Al_2O_3$, MgO spinel by depositing a monolayer of peptised gel on a porous substrate.

The boehmite sol used as identical with thaat used as the starting substance in Example I to III, and was filtered on a filter having a pore size of 0.4μ. The sol was diluted in 75% water, after which an organic binder, i.e. polyvinyl alcohol, was added in the proportion of 20 to 30% by weight with respect to the weight of aluminium oxide. Next, an aqueous solution of 81 g/l magnesium acetate was added in the proportion of 40 parts boehmite sol per 10 parts magnesium acetate. The peptised gel was released in vacuo in the presence of butanol.

The porous substrate used was of type a in Example I.

The peptised gel was deposited on the internal surface of the substrate by slip-painting at ambient temperature.

The resulting structure was dried in an oven at 80° C. for 3 hours, then fired at 600° C., the temperature being raised at 25° C. per hour so as to eliminate the organic binder, then at 100° C. per hour to 850° C., which temperature was continued for about an hour.

Table IV hereinafter gives the characteristics of the resulting membrane having a 3 $Al_2O_3$, MgO spinel structure.

TABLE IV

| Thickness of layer | Permeability to nitrogen ($10^{-7}$ mol/cm Hg/cm$^2$/min) | Permeametric radius of layer |
|---|---|---|
| 10μ | 620 | 45Å |

It can be seen that this method, wherein an organic binder is also used, gives continuous layers which are thicker, i.e. less permeable, than those obtained in the preceding examples.

EXAMPLE V

A permeable mineral membrane was made from 6 $Al_2O_3$, MgO spinel by depositing a monolayer of peptised gel on to a porous substrate. The boehmite sol used as identical with that in Examples I to III. It was filtered on a filter having an average pore size of 0.4μ. Next, the sol was diluted in 50% water. An aqueous solution of 81 g/l magnesium acetate was then introduced in the proportion of 80 parts boehmite sol per 10 parts magnesium acetate. Next, the gel was outgassed in vacuo in the presence of butanol.

The substrate used was of type a in Example I.

The peptised gel was deposited on the internal surface of the substrate by slip-painting at ambient temperature. The resulting assembly was dried in ambient air for 12 hours and fired at 850° C. for an hour, the temperature being raised at 100° C./h.

Table V hereinafter gives the characteristics of the resulting membrane, which had a homogeneous 6 $Al_2O_3$, MgO spinel structure.

TABLE V

| Permeability to nitrogen ($10^{-7}$ mol/cm Hg/cm$^2$/Min) | Permeametric radius of layer |
|---|---|
| 1200 | 60 Å |

It can be seen that, if smaller quantities of magnesium acetate are added, an n $Al_2O_3$, MgO aluminium spinel can be obtained in which n is greater than 3.

EXAMPLE VI

A permeable mineral membrane was manufactured by depositing a monolayer of peptised gel of mixed aluminium and magnesium hydroxide on a porous, permeable substrate.

The boehmite sol used in the preceding Examples was filtered on a filter having an average pore size of 0.4μ, then diluted in 100% water and 50% alcohol. An aqueous solution of 81 g/l magnesium acetate was added in the proportion of 40 parts boehmite sol to 10 parts magnesium acetate. Next, the sol was outgassed in vacuo in the presence of butanol.

A tubular alumina substrate was used, the internal surface of which had an average pore radius of 500 Å.

The sol was deposited on the internal surface of the substrate by slip-painting at ambient temperature. The resulting structure was dried in ambient air for 12 hours and then fired at 850° C. for an hour, the temperature being raised at 100° C./h.

Table VI hereinafter gives the characteristics of the resulting diaphragm.

TABLE VI

| Permeability to nitrogen ($10^{-7}$ mol/cm Hg/cm$^2$/min) | Permeametric radius of the layer | Efficiency in separating a natural mixture of argon. |
|---|---|---|
| 700 to 800 | 50 Å | 0.706 |

EXAMPLE VII

A permeable mineral membrane was manufactured by depositing a monolayer of peptised aluinium hydroxide gel on a porous substrate.

A 70 g/l boehmite sol was filtered on a filter having a pore size of 3μ, then concentrated to between 150 and 250 g/l by evaporating water. The viscosity of the thus-concentrated sol was between 150 and 200 cp. Next, the sol was outgassed in vacuo in the presence of butanol.

A porous tubular support was used, made of alumina α, its internal surface having an average pore radius of 0.4μ.

Next, the thus-concentrated sol was deposisted on the internal surface of the support by slip-painting at ambient temperature.

The resulting structure was dried in ambient air for 12 hours, then fired at 600° C., the temperature being raised at 100° C./h. It was then kept a 600° C. for an hour.

Table VII hereinafter gives the characteristics of the resulting diaphragm, which had an alumina γ structure.

TABLE VII

| Thickness of layer | Permeability to nitrogen ($10^{-7}$ mol/cm Hg/cm$^2$/min) | Permeametric radius of layer |
|---|---|---|
| 10 to 15μ | 300 | 40 Å |

EXAMPLE VIII

A sol was prepared, using magnesium perchlorate as the magnesium salt, and using either hydrochloric or perchloric acid for peptization.

The starting substance was a secondary butylate of aluminium hydrolyzed in a reactor with a large excess of water (100 mols H₂O per mol alcoholate) for approximately 2 hours. A quantity of magnesium chlorate was added, so as to obtain an Al/Mg ratio of 6.

Next, reflux peptization was brought about:
(1) Either in the presence of hydrochloric acid, the concentration of hydrochloric acid (i.e. the number of mols of HCl divided by the number of mols of alcoholate) varying from 0.09 to 0.15, or (2) In the presence of perchloric acid, the concentration of perchloric acid (i.e. the number of mols of HClO₄ divided by the number of mols of alcoholate) varying from 0.09 to 0.20.

The peptization time varied from 2 hours to 4 days. The solution was found to be clear after a few hours in peptization.

In all cases, the 3 Al₂O₃, MgO spinel structure was obtained at firing temperatures from 850° to 1000° C. for an hour.

Table VIII hereinafter gives the textures of the samples obtained and measured by he BJH method (Barret, Joyner, Halenda; JACS 73, 373 (1951).

TABLE VIII

| | Average radius of texture | Specific surface |
|---|---|---|
| Peptization in the presence of HCl with $\frac{\text{number of mols of HCl}}{\text{number of mols of alcoholate}} = 0.09$ | | |
| firing: 1 hour at 800° C. | 35 Å | 153 m²g⁻¹ |
| 1 hour at 850° C. | 40 Å | 134 m²g⁻¹ |
| 1 hour at 900° C. | 46 Å | 117 M²g⁻¹ |
| Peptization in the presence of HClO₄ with $\frac{\text{number of mols of HClO}_4}{\text{number of mols of alcoholate}} = 0.09$ | | |
| firing: 1 hour at 800° C. | 25 Å | 145 m²g⁻¹ |
| 1 hour at 850° C. | 25 Å | 134 m²g⁻¹ |
| 1 hour at 900° C. | 28 Å | 98 m²g⁻¹ |
| 1 hour at 1000° C. | 30.5 Å | 86 m²g⁻¹ |

Thus the method according to the invention, after heat-treatment, yields microporous layers which adhere very firmly to the substrate, are not heterogenous in thickness or permeametry and do not have cracks or macropores. The temperature and firing time can be chosen to obtain very homogeneous pore radii varying from 20 to 500 Å.

Permeable mineral membranes obtained by the method according to the invention are used in dependence on their permeabiliy characteristics and their average pore radii. Preferably, membranes having permeability of 200 to 600×10⁻⁷ mol/cm Hg/cm²/min, associated with average pore radii below 50 Å, are used for separating gases or gas isotopes. On the other hand, membranes having very high permeability up to 4000·10⁻⁷ mol/cm Hg/cm²/min and average pore radii of 50 to 200 Å are preferably used for ultrafiltration or filtration in general.

We claim:

1. In a method of manufacturing a porous, permeable mineral membrane having a mean pore radius in the range of less than 200 Å and a permeability to nitrogen of 200 to 3000·10⁻⁷ mol/cm Hg/cm²/min, the steps of depositing a voidless thin layer of a sol of aluminium hydroxide by slip painting without compacting on a permeable porous substrate and drying and firing the resulting membrane at a temperature between 500° and 1100° C. selected to obtain the desired mean pore radius.

2. In a method according to claim 1, the aluminum hydroxide sol being prepared by hydrolysis of an aluminum alcoholate followed by peptization of the thus-formed hydrated aluminum oxide in the presence of a strong acid selected from the group consisting of hydrochloric acid and perchloric acid.

3. A method according to claim 1, the substrate comprising a support having pore radii from 4 to 20 microns, the support being covered with a thin layer having a pore radius of 0.05 to 2 microns.

4. A method according to claim 3, the porous substrate being a ceramic material.

5. A method according to claim 3, the porous substrate being a alumina.

6. A method according to claim 3, the porous substrate being nickel.

7. A porous, permeable mineral membrane having a mean pore radius lower than 60 Å as obtained by he method according to claim 1.

8. In a method of manufacturing a porous, permeable membrane having a mean pore radius in the range of less than 200 Å and a permeability to nitrogen of 200 to 3000¹⁰⁻⁷ mol/cm Hg/cm²/min, the steps of depositing a voidless thin layer of a sol of mixed hydroxide of aluminum and another metal capable of forming an aluminum spinel after pyrolysis by slip painting without compacting, on a permeable porous substrate and drying and firing the resulting membrane at a temperature between 500° and 1100° C. selected to obtain the desired mean pore radius.

9. A method according to claim 8, the sol being a sol of mixed magnesium and aluminum hydroxide.

10. A method according to claim 8, the sol of mixed aluminum hydroxide being prepared by hydrolyzing an aluminum alcoholate, adding to the resulting solution a salt of a metal selected from the group consisting of magnesium, cobalt, copper, iron, manganese and nickel, and peptising the resulting solution in the presence of a strong acid selected from the group consisting of hydrochloric acid and perchloric acid.

11. A method according to claim 8, the sol of mixed aluminum hydroxide being prepared by hydrolysis of an aluminum alcoholate, peptising the resulting solution in the presence of a strong acid selected from the group consisting of hydrochloric and perchloric acid, and adding a salt of a metal selected from the group consisting of magnesium, cobalt, copper, iron, manganese and nickel.

12. A method according to claim 10, the magnesium salt being magnesium acetate.

13. A method according to claim 10, the magnesium salt being magnesium perchlorate.

14. A method according to claim 11, the magnesium salt being magnesium acetate.

15. A method according to claim 11, the magnesium salt being magnesium perchlorate.

16. A method according to claim 8, the subsrate comprises a support having a pore radius of 4 to 20 microns, the support being covered with a thin layer having a pore radius of 0.05 to 2 microns.

17. A method according to claim 16, the porous substrate being a ceramic material.

18. A method according to claim 16, the porous substrate being of a alumina.

19. A method according to claim 16, the porous substrate being nickel.

20. A porous, permeable mineral membrane having a mean pore radius lower than 60 Å as obtained by the method according to claim 8.

* * * * *